(12) United States Patent
Tajima et al.

(10) Patent No.: US 6,697,324 B2
(45) Date of Patent: Feb. 24, 2004

(54) OPTICAL DATA RECORDING MEDIUM

(75) Inventors: Hideharu Tajima, Tenri (JP);
Nobuyuki Takamori, Kitakatsuragi-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 171 days.

(21) Appl. No.: 10/107,973

(22) Filed: Mar. 27, 2002

(65) Prior Publication Data

US 2002/0141329 A1 Oct. 3, 2002

(30) Foreign Application Priority Data

Mar. 28, 2001 (JP) ........................................ 2001-093113

(51) Int. Cl.⁷ ................................................. G11B 7/24
(52) U.S. Cl. ........................ 369/283; 369/280; 369/288
(58) Field of Search ................................. 369/280, 283, 369/288

(56) References Cited

U.S. PATENT DOCUMENTS

| | | | | |
|---|---|---|---|---|
| 5,013,594 A | * | 5/1991 | Mizumura et al. | 428/64.7 |
| 5,080,946 A | * | 1/1992 | Takagisi et al. | 428/64.9 |
| 5,705,247 A | * | 1/1998 | Arai et al. | 428/64.1 |

FOREIGN PATENT DOCUMENTS

| | | | | |
|---|---|---|---|---|
| JP | 01-226533 | * | 9/1989 | |
| JP | 04-195745 | | 7/1992 | ............ G11B/11/10 |
| JP | 04-364248 | | 12/1992 | ............ G11B/11/10 |
| JP | 11-016211 | | 1/1999 | ............ G11B/7/24 |
| JP | 2000-311381 | | 11/2000 | ............ G11B/7/24 |

* cited by examiner

*Primary Examiner*—David L. Ometz
*Assistant Examiner*—Mark Blouin
(74) *Attorney, Agent, or Firm*—Edwards & Angell, LLP; David G. Conlin; Richard J. Roos

(57) ABSTRACT

This invention is an optical data recording medium having a substrate protective film for effectively suppressing deformation (warpage) associated with change in environmental humidity. The optical data recording medium includes a transparent substrate, a thin film layer formed on one surface of the transparent substrate, a thin film protective film formed of a resin as a main component on the thin film layer, and a substrate protective film formed of a resin as a main component on the other surface of the transparent substrate than the thin film protective film, in which the thin film layer is a single layer film or a multi-layer film including at least one of a dielectric film, a recording film and a reflective film, and the substrate protective film has a coefficient of humidity expansion that is larger than a coefficient of humidity expansion of the thin film protective film.

7 Claims, 5 Drawing Sheets

|  | Substrate protective film 30 | | Transparent substrate 20 | |
| --- | --- | --- | --- | --- |
|  | Material | Thickness (μm) | Material | Thickness (mm) |
| Medium 1 | - | - | Polyolefin series resin | 0.5 |
| Medium 2 | UV curable resin 2 | 5 | Polyolefin series resin | 0.5 |

|  | Thin film 40 | | Thin film protective film 50 | |
| --- | --- | --- | --- | --- |
|  | Material | Thickness (nm) | Material | Thickness (μm) |
| Medium 1 | AlN | 48 | UV curable resin 1 | 15 |
| Medium 2 | AlN | 48 | UV curable resin 1 | 15 |

OPTICAL DATA RECORDING MEDIUM

CROSS-REFERENCE TO RELATED APPLICATION

This application is related to Japanese application No. 2001-093113 filed on Mar. 28, 2001 whose priority is claimed under 35 USC § 119, the disclosure of which is incorporated by reference in its entirety.

BACKGROUND OF THE INVENTION

1. Field of the Invention

The present invention relates to an optical data recording medium on which data is recorded and from which data is reproduced, and more particularly, it relates to an optical data recording medium capable of preventing its warp caused by a change in ambient conditions.

2. Description of Related Art

FIG. 1 is a schematic sectional view illustrating a structure of an optical data recording medium. A conventional optical data recording medium is shown in a plan view and a side view of FIGS. 8(a) and 8(b), respectively.

An optical data recording medium comprises, as shown in FIG. 1, a single layered or multilayered thin film layer 40 including at least any one of dielectric films 41, 43 (silicon nitride), a recording film 42 (TbFeCo) and a reflective film 44 (Al) is formed by sputtering or the like on a disc-shaped substrate 20 made of a polycarbonate. On the thin film layer 40, a protective film 50 such as a resin film for protecting the thin film layer is formed. Further, another protective film 30 such as a resin film for protecting the substrate is formed on a light receiving surface of the substrate.

The substrate 20 is about 1.2 mm thick, the single layered or multilayered thin film layer 40 formed by sputtering is 10-300 nm thick, the protective film 50 is 1-30 $\mu$m thick, and the protective film 30 is 0.1-30 $\mu$m thick.

Since the polycarbonate substrate 20 constitutes almost the entire thickness of the optical data recording medium, rigidity of the medium substantially depends on that of the polycarbonate substrate 20. With the sufficient thickness of the polycarbonate substrate 20, deformation of the medium caused by a change in ambient conditions (temperature and humidity) is very small and there is no need to pay attention to a balance between stresses and bending moments generated in the layers.

However, in recent years, high density recordation and reproduction on and from the optical data recording medium are demanded, and there is a tendency that attempts to increase NA of an objective lens and to decrease the thickness of the substrate are made to decrease a diameter of a beam spot for realizing high density recordation and reproduction. In particular, there is a tendency that the thickness of the substrate is decreased from 1.2 mm, which is a conventional value, to a half or less of the conventional value, i.e., 0.6 mm and 0.5 mm. In the case where the substrate becomes thin, the rigidity of the optical data recording medium 10 is reduced accordingly.

When the rigidity is reduced, distortion caused by stress due to environmental change (temperature and humidity change) in respective layers constituting the optical data recording medium 10 is increased, and such a problem occurs that recordation and reproduction of data becomes difficult.

Therefore, even in the case where the thickness of the transparent substrate 20 is decreased to reduce the rigidity, it is demanded that distortion of the substrate is suppressed as far as possible, so as to provide an optical data recording medium having exhibiting high performance in resistance to environmental change.

As a method for controlling deformation of an optical data recording medium, Japanese Patent Publication No. Hei 4(1992)-195745 proposes a method, in which a dielectric film for preventing warpage is provided on the back surface of the substrate (i.e., the surface on the side where the thin film layer is not formed).

FIG. 5 is a cross sectional view showing the constitution of the conventional optical data recording medium. In FIG. 5, the same symbols are attached to the same parts as in FIG. 1. As shown in FIG. 5, a dielectric layer 60 is provided on the light receiving surface to equate the expansion coefficients of the thin film layer 40 and the dielectric layer 60 on both sides of the transparent substrate 20, whereby a symmetric structure with respect to the transparent substrate 20 is created in the optical data recording medium to prevent warpage of the optical data recording medium.

Japanese Patent Publication No. Hei 11(1999)-16211 discloses an optical data recording medium having the same structure as shown in FIG. 1, in which a substrate protective film having a rigidity higher than that of the substrate is formed to reduce deformation upon environmental change.

Japanese Patent Publication No. Hei 4(1992)-364248 discloses a data recording medium aiming prevention of warpage caused by humidity change. FIG. 6 is a cross sectional view showing the constitution of the data recording medium disclosed in Japanese Patent Publication No. Hei 4(1992)-364248.

The recording medium contains a thin film protective film 50, a thin film layer 40, a substrate 20 and a substrate protective film (dielectric layer) 30, and furthermore, in order to prevent warpage due to humidity change, a moisture permeation preventing film 70 formed with $SiO_2$ or AlN is provided between the substrate 20 and the substrate protective film 30.

Japanese Patent Publication No. 2000-311381 discloses an optical data recording medium having the structure as shown in FIG. 1 containing a thin film protective film 50, a thin film layer 40, a substrate 20 and a substrate protective film 30, in which the substrate protective film 30 has a moisture permeability smaller than that of the thin film protective film 50, whereby warpage caused by moisture change is reduced.

In the above-mentioned conventional recording media according to both of the publications Japanese Patent Publication No. Hei 4(1992)-195745 and Japanese Patent Publication No. Hei 4(1992)-364248, the dielectric layer (30, 60) must be formed by sputtering or the like on the light receiving surface of the substrate. Accordingly, in the manufacture thereof, the thin film layer 40 is formed on a surface of the substrate and then the substrate is turned over to form the dielectric layer (60, 30) on an opposite surface. Therefore, the manufacture is complicated and the charge of the manufacture facility is raised, which increases the manufacture cost.

In the method disclosed in Japanese Patent Publication No. Hei 11(1997)-16211, it is necessary to form $SiO_2$ as the substrate protective film on the substrate through plasma CVD, and thus the same problem arises as in Japanese Patent Publication No. Hei 4(1992)-195745.

In the method disclosed in Japanese Patent Publication No. Hei 4(1992)-364248, it is necessary to form AlN or $SiO_2$ on the light receiving surface of the substrate through sputtering, and thus the same problem arises as in Japanese Patent Publication No. Hei 4(1992)-195745.

In the method disclosed in Japanese Patent Publication No. 2000-311381, when a substrate 20 formed with a transparent resin, such as an acrylic series, a polyolefin series and polycarbonate, is used, the thin film protective film 50 is formed with a resin that suffers expansion with humidity more than the substrate 20 in most cases, and thus such a problem arises that the warpage phenomenon cannot be completely prevented.

SUMMARY OF THE INVENTION

The invention relates to, as one aspect, an optical data recording medium comprising a transparent substrate, a thin film layer formed on one surface of the transparent substrate, a thin film protective film comprising a resin as a main component formed on the thin film layer, and a substrate protective film comprising a resin as a main component formed on the other surface of the transparent substrate than the thin film protective film, wherein the thin film layer is a single layer film or a multi-layer film comprising at least one of a dielectric film, a recording film and a reflective film, and the substrate protective film has a coefficient of humidity expansion that is larger than a coefficient of humidity expansion of the thin film protective film.

According to the configuration, deformation (warpage) upon change in humidity can be effectively suppressed.

DESCRIPTION OF THE PREFERRED EMBODIMENTS

Figure 1:
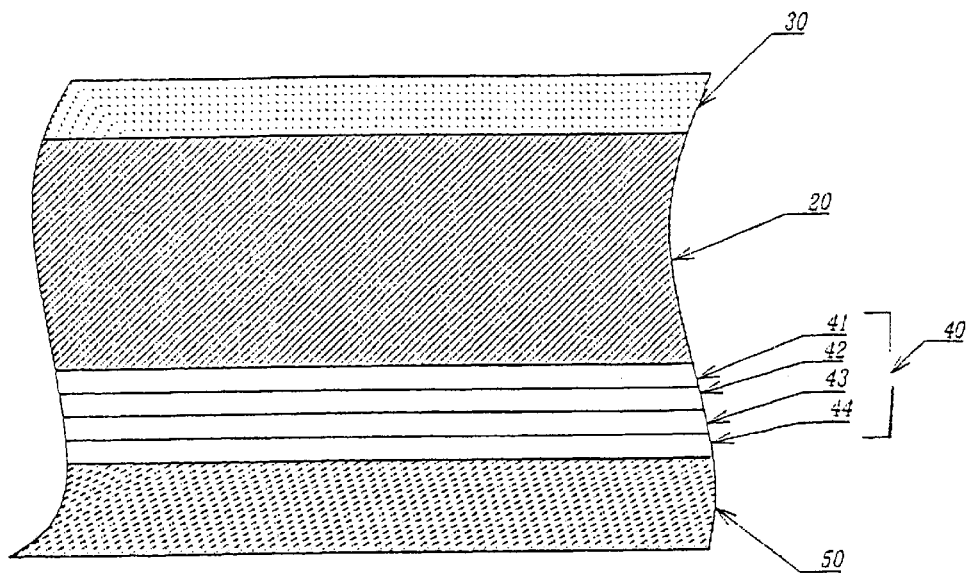
FIG. 1 is a cross sectional view showing one constitution of an optical data recording medium according to the invention.

This invention is an optical data recording medium that can be more effectively prevented from deformation (warpage) associated with change in humidity.

In this invention, the substrate protective film herein may have a coefficient of humidity expansion of $1.6 \times 10^{-5}$ (1/%) or more.

It is preferred upon consideration of expansion due to temperatures that the substrate protective film has a coefficient of thermal expansion that is equal to or smaller than a coefficient of thermal expansion of the transparent substrate.

It is possible to satisfy at least one or all of the requirements that the substrate protective film has a hardness higher than that of the transparent substrate, has an electric conductivity higher than that of the transparent substrate, and has a transmittance of 80% or more in a short wavelength region. The term, short wavelength region, herein means a wavelength region around 405 nm.

The invention also relates to, as another aspect, a method for selecting a substrate protective film of an optical data recording medium, the substrate protective film having the coefficient of humidity expansion of $1.6 \times 10^{-5}$ (1/%) or more, the optical data recording medium comprising a transparent substrate, a thin film layer formed on one surface of the transparent substrate, a thin film protective film comprising a resin as a main component formed on the thin film layer, and a substrate protective film comprising a resin as a main component formed on the other surface of the transparent substrate than the thin film protective film, the thin film layer being a single layer film or a multi-layer film comprising at least one of a dielectric film, a recording film and a reflective film, the substrate protective film having the coefficient of humidity expansion that is larger than the coefficient of humidity expansion of the thin film protective film, and the transparent substrate comprising polycarbonate or polyolefin and having a thickness of 0.5 mm or more.

In the invention, the term, humidity expansion coefficient, means a value of an expansion amount per unit length that is converted to an expansion rate per 1% humidity when the relative humidity around the objective is increased at a constant temperature (25° C.).

As the material of the transparent substrate, for example, polycarbonate or polyolefin may be used. In order to effectively prevent warpage of the medium, the substrate protective film and the thin film protective film are formed with materials that satisfy the relationship of the coefficients of humidity expansion described in the foregoing, and can be formed, for example, with an ultraviolet ray (UV) curable resin, particularly, an ultraviolet ray curable resin containing polyester acrylate, epoxy acrylate, urethane acrylate or polyether acrylate as a main component.

As a material of the substrate protective film, it is preferable to use a material containing a large amount of a component having high hydrophilicity from the standpoint of the use of a material having a large humidity expansion coefficient as far as possible.

The invention will be described with reference to the attached drawings, but the invention is not construed as being limited thereto.

The optical data recording medium that is directed in the invention has an appearance and a constitution that are substantially same as those shown in FIG. 1.

For example, on a transparent substrate 20 formed with a resin, such as polycarbonate, an acrylic series and a polyolefin series, a thin film layer 40 of a single layer structure or a multi-layer structure containing thin films, such as first and second dielectric film 41 and 43 (such as silicon nitride), a recording film 42 (such as TbFeCo) and a reflective film 44 (such as Al) are formed, and a thin film protective film 50 containing a resin as a main component is formed on the thin film layer 40. Further, a substrate protective film 30 containing a resin as a main component for protecting the transparent substrate 20 is formed on the opposite surface of the transparent substrate 20.

In this embodiment, the transparent substrate 20 has a thickness of 0.5 mm, the thin film layer 40 has a thickness of 48 nm, the thin film protective film 50 has a thickness of 15 μm, and the substrate protective film 30 has a thickness of about 5 μm.

Because the respective layers are formed with different materials and are different in thickness, the coefficient of humidity expansion, which are physical property values of the respective layers, are different from each other, and values of stress occurring in the layers upon change in humidity are different from each other. In the constitution shown in FIG. 1, ss of the substrate protective film 30 and the thin film protective film 50 are generally larger than those of the transparent substrate 20 and the single layer or multi-layer thin film layer 40, and thus expansion of the transparent substrate 20 and the single layer or multi-layer thin film layer 40 in the radial direction of the substrate is considerably smaller than that of the other layers.

Therefore, the cause of deformation upon humidity change is liable to be dominated by the expansion coefficients and the thickness of the substrate protective film 30 and the thin film protective film 50. Because the substrate protective film 30 is present on the light receiving surface of the medium, it suffers various restrictions, such as transmissibility of laser light and distribution of thickness, and thus it is formed to have a smaller thickness than the thin film protective film 50.

In the case where the humidity is increased, in general, when two films formed on both surfaces are formed with the same material, stress occurring in a film having a larger thickness is larger than that occurring in a film having a smaller thickness, and therefore, warpage occurs on the side where the film having a smaller thickness is formed.

Figure 2:
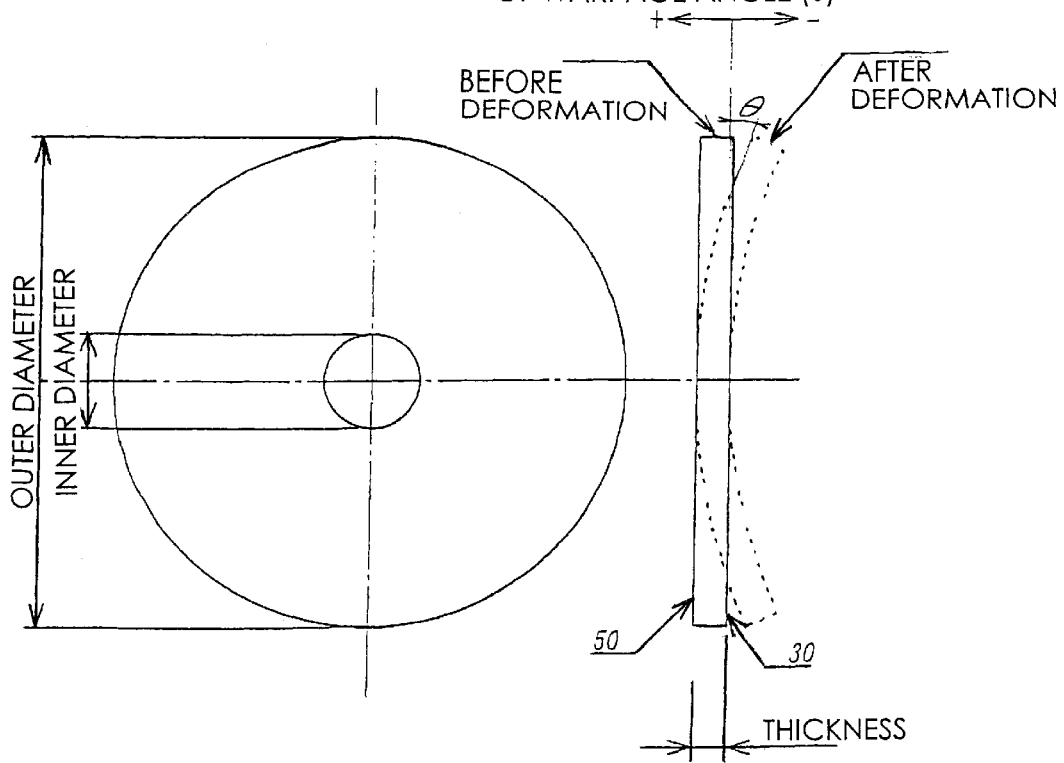
FIG. 2 is a diagram showing the state of deformation of an optical data recording medium.

In the invention, accordingly, because the substrate protective film 30 is thinner than the thin film protective film 50, the optical data recording medium 10 is liable to warp upon humidity change in the thickness direction perpendicular to the radial direction thereof toward the side where the substrate protective film 30 is formed as shown in FIG. 2.

In FIG. 2, with the assumption that the warpage angle (θ) upon warping toward the left hand is referred to as a positive (+) direction, warpage of a warpage angle of a negative direction occurs in this case.

In order to suppress the warpage in the negative direction, both the substrate protective film 30 and the thin film protective film 50 are formed in such a manner that the coefficient of humidity expansion of the substrate protective film 30 having a smaller thickness is larger than the coefficient of humidity expansion of the thin film protective film 50. For example, in the case where the coefficient of humidity expansion of the thin film protective film 50 is about $1.6 \times 10^{-5}$ (1/%), a substrate protective film 30 having a value larger than this may be employed.

According to the configuration, the bending moment applied to the transparent substrate 20 by the thin film protective film 50 upon humidity change can be balanced with the bending moment applied to the transparent substrate 20 by the substrate protective film 30.

In the case where the coefficient of thermal expansion of the substrate protective film 30 is larger than that of the transparent substrate 20, warpage (the positive warpage angle) in the direction opposite to the case of the humidity change is liable to occur upon temperature change in comparison to the state where no substrate protective film 30 is provided.

Taking such a point into consideration, it is preferred that the coefficient of thermal expansion of the substrate protective film 30 is equal to or smaller than the coefficient of thermal expansion of the transparent substrate 20. For example, when the coefficient of thermal expansion of the transparent substrate 20 is $6.6 \times 10^{-5}$ (1/° C.), the coefficient of thermal expansion of the substrate protective layer 30 may be about $6.3 \times 10^{-5}$ (1/° C.).

It is also preferred that the substrate protective film 30 has a hardness higher than that of the transparent substrate 20 to prevent damages on the surface while it is the function of accomplishing the primary role of the substrate protective film 30.

In order to prevent attachment of dusts, such as powder dusts, it is preferred that the electroconductivity of the substrate protective film 30 is higher than that of the transparent substrate 20.

Furthermore, in the case where a short wavelength laser is mainly used to carry out high density recording, it is preferred that the substrate protective film 30 has a high transmittance (for example, about 80%) in a region of the short wavelength laser of about 405 nm to assure sufficient reliability of high density recording.

Therefore, in order to suppress warpage upon humidity change without suffering adverse affects on warpage due to temperature change, it is preferred that the coefficient of humidity expansion of the substrate protective film 30 is larger than the coefficient of humidity expansion of the thin film protective film 50, and simultaneously, the substrate protective film 30 satisfies the conditions in linear expansion coefficient, hardness, electroconductivity and transmittance in the short wavelength region.

One example of the optical data recording medium of the invention will be described.

An optical data recording medium having the same layer structure as shown in FIG. 1 was produced as an example of the optical data recording medium according to the invention. That is, such a medium was produced that contains a substrate protective film 30, a transparent substrate 20, a thin film layer 40 (a dielectric film 41, a recording film 42, a dielectric film 43 and a reflective film 44), and a thin film protective film 50 accumulated in this order from the side of the light receiving surface.

For comparison, a medium 1 using no substrate protective film 30 and a medium 2 using the substrate protective film 30 formed as one example of the invention were produced.

Figures 7, 8A, 8B:
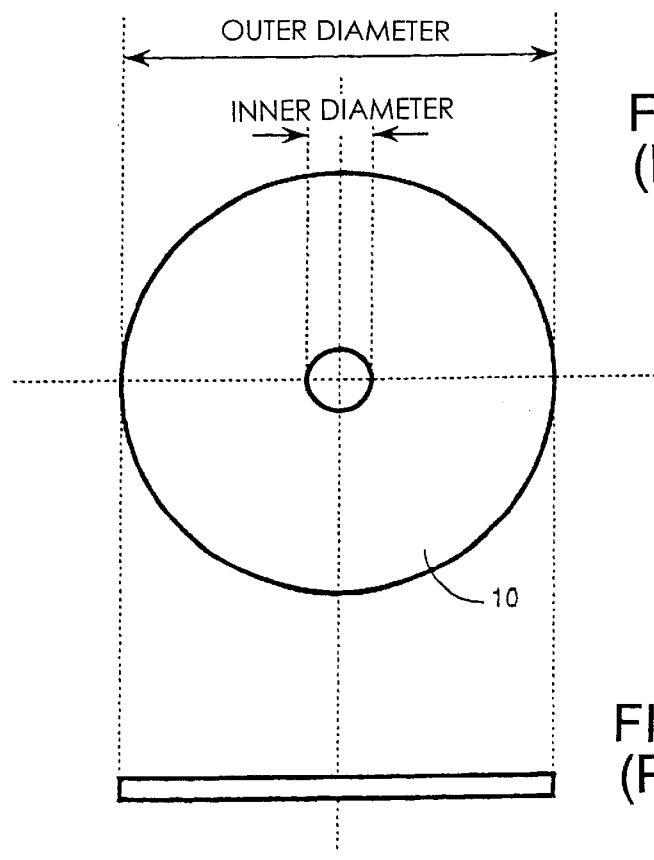
FIG. 7 is a diagram showing comparisons of materials and thickness of constitutional components of two media.
FIGS. 8A and 8B are a plane view and an elevational view, respectively, of a conventional optical data recording medium.

FIG. 7 is a diagram showing comparisons of materials and thickness of the constitutional components of the two media.

A film of an UV curable resin having a thickness of about 15 μm, which was considered to have a relatively small humidity expansion coefficient and a small change amount in warpage angle on humidity change among resins, was used as the thin film protective film 50. A film of a polyolefin series resin having a thickness of about 0.5 mm was used as the transparent substrate 20. While the thin film layer 40 may be formed as a multi-layer film, a single layer film formed with AlN having a thickness of about 48 nm was used in this example because the dielectric films 41 and 43 largely affect on the cause of warpage.

The thin film protective films 50 of the media 1 and 2 are formed with the same material, the UV curable resin 1. The substrate protective film 30 of the medium 2 was formed with an UV curable resin 2, which is different from the thin film protective film 50 in humidity expansion coefficient. As noted in the foregoing, since the coefficient of humidity expansion of the substrate protective layer 30 was preferably larger than that of the thin film protective film 50, the coefficient of humidity expansion of the UV curable resin 1 of the thin film protective film 50 was $1.6 \times 10^{-5}$ (1/%), and the UV curable resin 2 of the substrate protective film 30 was $2.5 \times 10^{-5}$ (1/%).

The polyolefin series resin constituting the transparent substrate 20 had the coefficient of thermal expansion of $6.6 \times 10^{-5}$ (1/° C.), and the UV curable resin 2 constituting the substrate protective film 30 had the coefficient of thermal expansion of $6.3 \times 10^{-5}$ (1/° C.), which was slightly smaller than that of the transparent substrate 20.

Both the media 1 and 2 were circular media having an inner diameter of 7 mm and an outer diameter of 50 mm.

Figure 3:
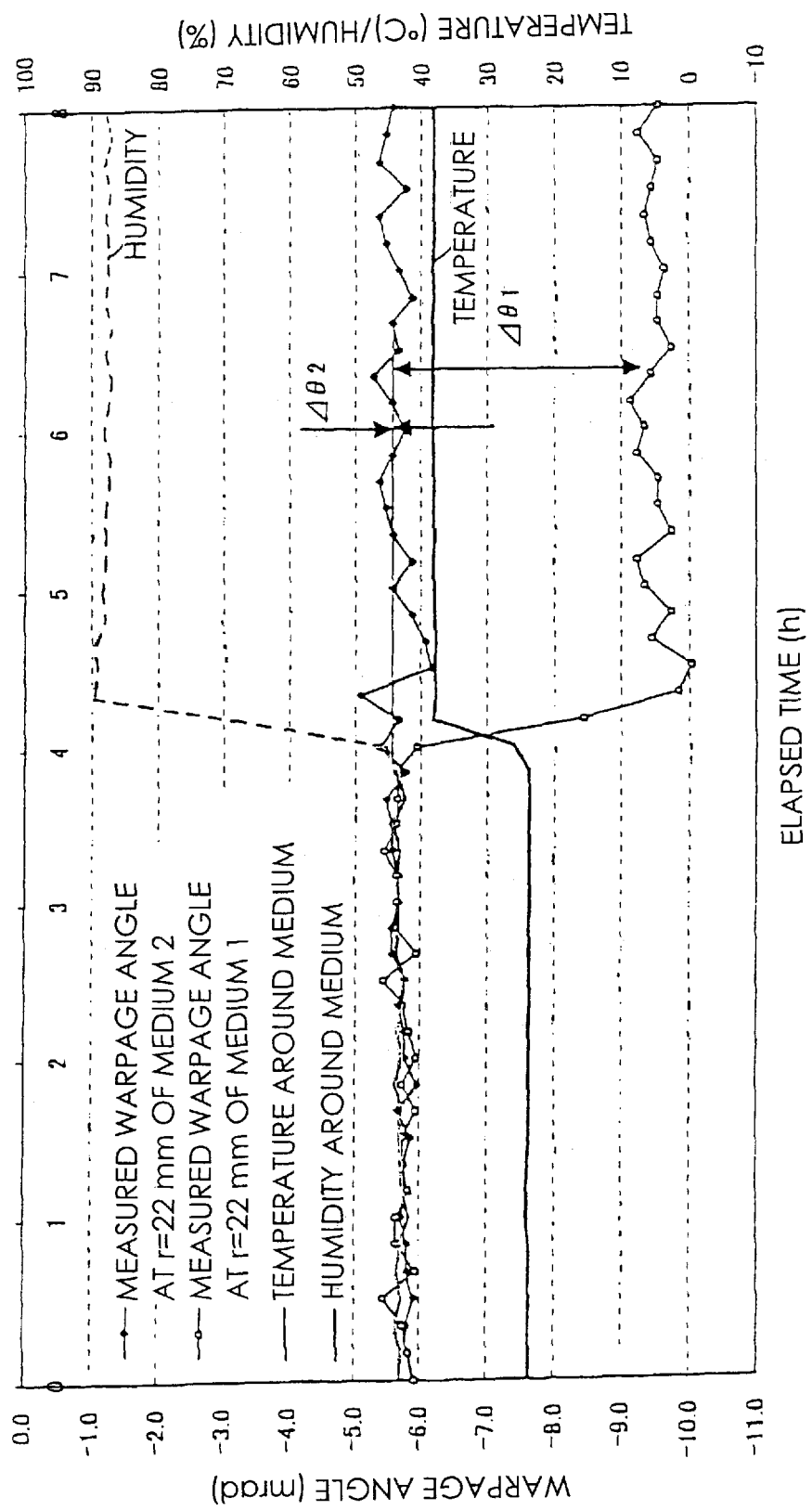
FIG. 3 is a graph showing a comparison of time-lapse change of a warpage angle of two media upon change in humidity.

FIG. 3 is a graph showing a comparison of time-lapse change of a warpage angle (θ) of two media mainly upon change in humidity.

This is a graph where the temperature and the humidity are changed from 23° C. and 50% to 38° C. and 90%. The warpage angle (θ) thus measured is that on an outer periphery of the medium, i.e., at a position of a radius (r) from the center of 22 mm. In this graph, the black dots show the measured values of the warpage angle (θ) of the medium 2 according to the invention, whereas the white dots show the measured values of the warpage angle (θ) of the medium 1. The solid line shows the temperature, and the broken line shows the humidity.

It is understood from FIG. 3 that the medium 2 of the invention suffers substantially no change in warpage angle even when the humidity is changed, but the medium 1 having no substrate protective film 30 suffers a large change in warpage angle when the humidity is largely increased. The change amount Δθ1 of the warpage angle of the medium 1 is about 4 (mrad), whereas the change amount Δθ2 of the medium 2 of the invention is 0.5 (mrad) at most, which is considered to be substantially zero.

Therefore, it is understood from FIG. 3 that warpage can be suppressed by forming the substrate protective film 30 having a large humidity expansion coefficient in comparison to the case where no such film is formed.

Figure 4:
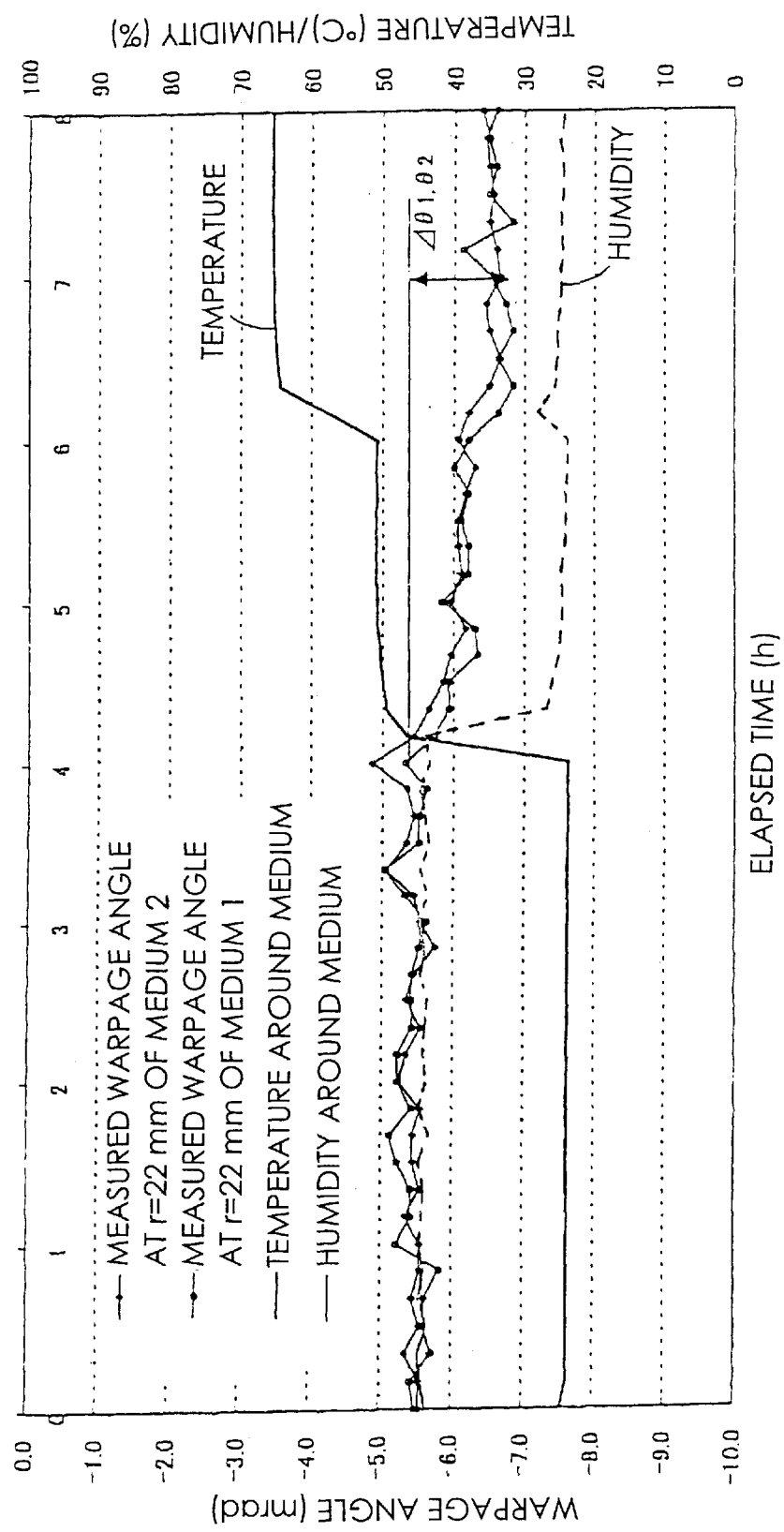
FIG. 4 is a graph showing a comparison of time-lapse change of a warpage angle of two media upon change in temperature.
Figure 5:
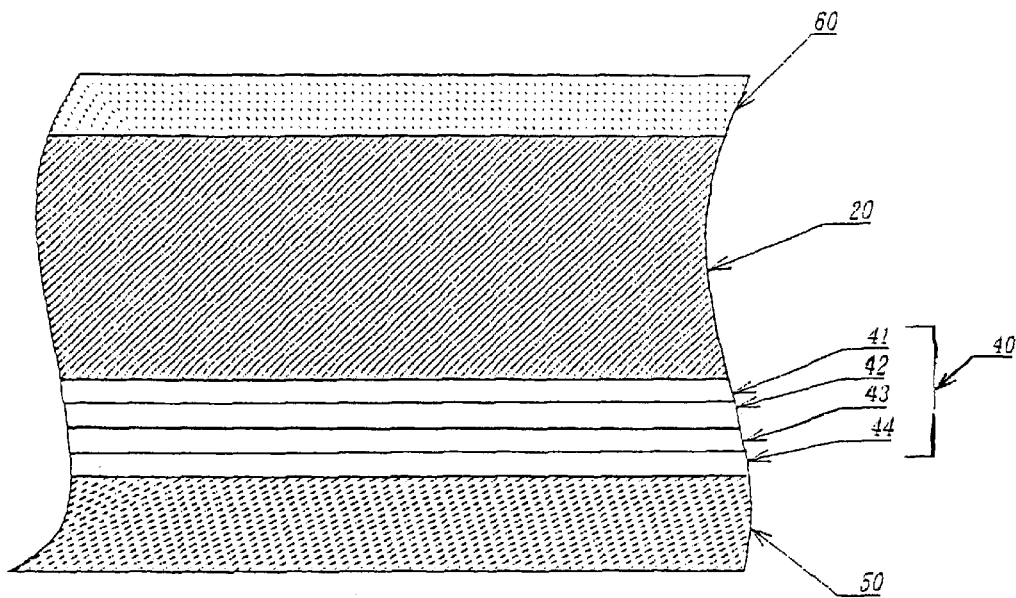
FIG. 5 is a cross sectional view showing a constitution of a conventional optical data recording medium.
Figure 6:
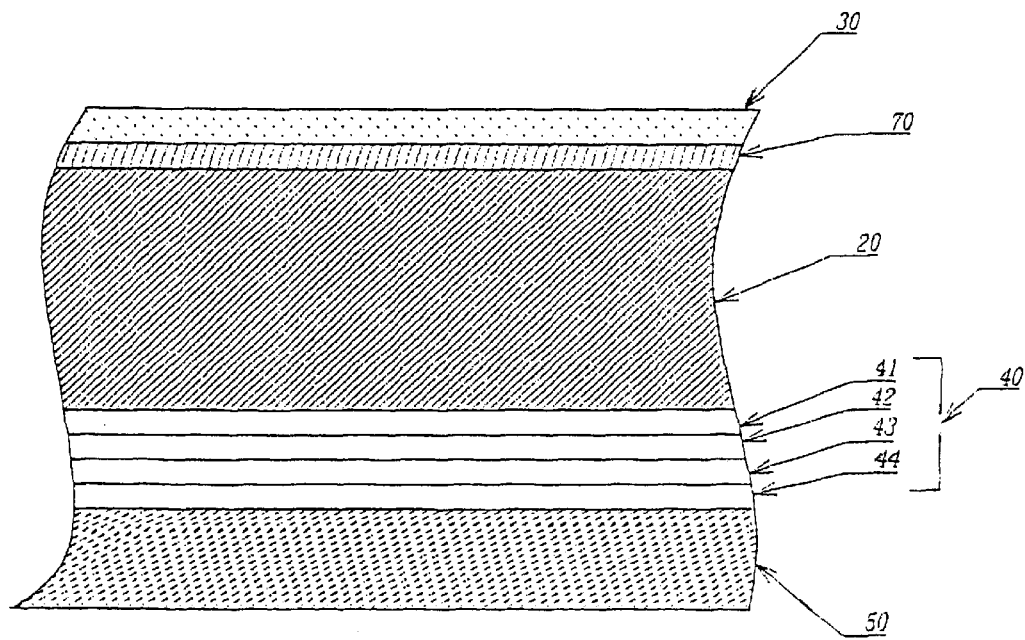
FIG. 6 is a cross sectional view showing another constitution of a conventional optical data recording medium.

FIG. 4 is a graph showing a comparison of time-lapse change of a warpage angle (θ) of two media mainly upon change in temperature.

This is a graph where the temperature and the humidity are changed from 23° C. and 45% to 65° C. and 25%. The position where the warpage angle (θ) is measured is the same as that in FIG. 3.

It is understood from FIG. 4 that there is substantially no difference between the media in change amount of the warpage angle (θ) even when the temperature is largely changed.

The fact that there is substantially no change amount of the warpage angle (θ) is similarly found in the case where the coefficient of thermal expansion of the substrate protective film 30 is equated with that of the transparent substrate 20.

Consequently, it is understood in the medium 2 according to the invention that warpage is not aggravated by temperature change because the substrate protective film 30 having the coefficient of thermal expansion that is equal to or smaller than that of the transparent substrate 20.

It is understood from the results shown in the foregoing that because a substrate protective film having the coefficient of humidity expansion that is larger than the coefficient of humidity expansion of a thin film protective film and the coefficient of thermal expansion that is equal to or smaller than that of the transparent substrate is formed on the transparent substrate, the warpage angle upon humidity change can be suppressed without deterioration in change in warpage angle by temperature change.

As described in detail in the foregoing, the following effects can be obtained by the invention.

(1) The substrate protective film having the coefficient of humidity expansion that is larger than that of the thin film protective film is formed on the transparent substrate of the optical data recording medium, and therefore, warpage upon change in humidity can be suppressed, so as to improve reliability of recordation and reproduction.

(2) The substrate protective film has the coefficient of thermal expansion that is equal to or smaller than the coefficient of thermal expansion of the transparent substrate, and therefore warpage upon change in humidity can be suppressed without aggravation of the warpage upon change in temperature, so as to improve reliability of recordation and reproduction.

(3) The substrate protective film having a hardness that is larger than the hardness of the transparent substrate is provided, and therefore, the surface of the substrate is difficult to be damaged, so as to improve reliability of recordation and reproduction.

(4) The substrate protective film having an electroconductivity that is larger than the electroconductivity of the transparent substrate is provided, and therefore, dusts, such as powder dusts, are difficult to be attached, so as to improve reliability of recordation and reproduction.

(5) The substrate protective film having a transmittance that is large in the short wavelength region is provided, and therefore, a short wavelength laser, such as a blue laser, can be used upon recordation and reproduction of data, so as to provide high density recordation and reproduction with high reliability.

What is claimed is:

1. An optical data recording medium comprising a transparent substrate, a thin film layer formed on one surface of the transparent substrate, a thin film protective film comprising a resin as a main component formed on the thin film layer, and a substrate protective film comprising a resin as a main component formed on the other surface of the transparent substrate than the thin film protective film, wherein the thin film layer is a single layer film or a multi-layer film comprising at least one of a dielectric film, a recording film and a reflective film, and the substrate protective film has a coefficient of humidity expansion that is larger than a coefficient of humidity expansion of the thin film protective film.

2. An optical data recording medium as claimed in claim 1, wherein the substrate protective film has a coefficient of thermal expansion that is equal to or smaller than a coefficient of thermal expansion of the transparent substrate.

3. An optical data recording medium as claimed in claim 1, wherein the substrate protective film has a hardness that is higher than that of the transparent substrate.

4. An optical data recording medium as claimed in claim 1, wherein the substrate protective film has an electric conductivity that is higher than that of the transparent substrate.

5. An optical data recording medium as claimed in claim 1, wherein the substrate protective film has a transmittance of 80% or more in a short wavelength region.

6. An optical data recording medium as claimed in claim 1, wherein the substrate protective film has a coefficient of humidity expansion of $1.6 \times 10^{-5}$ (1/%) or more.

7. A method for selecting a substrate protective film of an optical data recording medium including a transparent substrate, a thin film layer formed on one surface of the transparent substrate, a thin film protective film comprising a resin as a main component formed on the thin film layer, and a substrate protective film comprising a resin as a main component formed on the other surface of the transparent substrate than the thin film protective film, the method comprising selecting the substrate protective film so that the substrate protective film has a coefficient of humidity expansion of $1.6 \times 10^{-5}$ (1/%) or more in the case where the thin film layer is a single layer film or a multi-layer film comprising at least one of a dielectric film, a recording film and a reflective film, the substrate protective film has a coefficient of humidity expansion that is larger than a coefficient of humidity expansion of the thin film protective film and the transparent substrate comprises polycarbonate or polyolefin and has a thickness of 0.5 mm.

* * * * *